United States Patent
Carro

(10) Patent No.: US 10,664,153 B2
(45) Date of Patent: May 26, 2020

(54) DEVICE AND SYSTEM FOR RETRIEVING AND DISPLAYING HANDWRITTEN ANNOTATIONS

(75) Inventor: Fernando Incertis Carro, Valencia (ES)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 608 days.

(21) Appl. No.: 13/451,736

(22) Filed: Apr. 20, 2012

(65) Prior Publication Data

US 2012/0200519 A1     Aug. 9, 2012

Related U.S. Application Data

(62) Division of application No. 10/317,504, filed on Dec. 12, 2002, now abandoned.

(30) Foreign Application Priority Data

Dec. 21, 2001  (EP) .................................. 01480138

(51) Int. Cl.
*G06F 3/0488*       (2013.01)
(52) U.S. Cl.
CPC ................................ *G06F 3/04883* (2013.01)
(58) Field of Classification Search
CPC ..... G06F 3/044; G06F 3/04883; G06F 3/0488
USPC ........................................................ 345/173
See application file for complete search history.

(56) References Cited

U.S. PATENT DOCUMENTS

| | | | |
|---|---|---|---|
| 3,567,859 A * | 3/1971 | Ellis | ................ G06F 3/044 178/19.01 |
| 3,760,360 A | 9/1973 | Reynolds et al. | |
| 4,190,831 A | 2/1980 | Stahle et al. | |
| 4,263,592 A | 4/1981 | Takahashi et al. | |
| 4,274,081 A | 6/1981 | Nomura et al. | |
| 4,277,783 A | 7/1981 | Sampieri et al. | |
| 4,289,333 A | 9/1981 | Gaetano | |
| 4,348,660 A | 9/1982 | Robersten et al. | |
| 4,367,465 A | 1/1983 | Mati et al. | |
| 4,377,810 A | 3/1983 | Wolff | |

(Continued)

FOREIGN PATENT DOCUMENTS

| | | |
|---|---|---|
| EP | 0622722 | 2/1994 |
| EP | 0652505 | 5/1995 |

(Continued)

OTHER PUBLICATIONS

Response (File Date Aug. 12, 2005) to Non-Final Office Action (dated Mar. 13, 2007) for U.S. Appl. No. 09/923,150, filed Apr. 6, 2001; Confirmation No. 8930.

(Continued)

*Primary Examiner* — Jeff Piziali
(74) *Attorney, Agent, or Firm* — Michael P. O'Keefe; Andrew M. Calderon; Roberts Calderon Safran & Cole, P.C.

(57) ABSTRACT

An apparatus for capturing and displaying handwritten annotations, for use with a computer system, comprises a transparent digitizing tablet adapted to cooperate with a stylus in order to capture handwritten annotations. It also comprises a transparent electro-luminescent display adapted to display captured handwritten annotations, the transparent digitizing tablet being superposed on the transparent electro-luminescent display.

17 Claims, 9 Drawing Sheets

(56) References Cited

U.S. PATENT DOCUMENTS

| | | |
|---|---|---|
| 4,454,417 A | 6/1984 | May |
| 4,504,913 A | 3/1985 | Miura et al. |
| 4,523,188 A | 6/1985 | Huber |
| 4,532,395 A | 7/1985 | Zukowski |
| 4,550,310 A | 10/1985 | Yamaguchi et al. |
| 4,565,947 A | 1/1986 | Minn |
| 4,571,684 A | 2/1986 | Takanabe et al. |
| 4,591,841 A | 5/1986 | Gunderson et al. |
| 4,602,907 A | 7/1986 | Foster |
| 4,620,107 A | 10/1986 | Frame |
| 4,642,459 A | 2/1987 | Caswell et al. |
| 4,661,811 A | 4/1987 | Gray et al. |
| 4,675,665 A | 6/1987 | Halliwell |
| 4,677,428 A | 6/1987 | Bartholow |
| 4,680,430 A | 7/1987 | Yoshikawa et al. |
| 4,686,332 A * | 8/1987 | Greanias ............... G06F 3/044 345/173 |
| 4,697,175 A | 9/1987 | Macdonald |
| 4,723,836 A * | 2/1988 | Kono et al. .................. 349/12 |
| 4,752,773 A * | 6/1988 | Togawa et al. .............. 345/156 |
| 4,782,328 A | 11/1988 | Denlinger |
| 4,789,836 A | 12/1988 | May |
| 4,802,722 A | 2/1989 | Persson |
| 4,812,980 A | 3/1989 | Yamada |
| 4,812,828 A | 5/1989 | Nishi et al. |
| 4,849,911 A | 7/1989 | Campian |
| 4,853,498 A | 8/1989 | Meadows et al. |
| 4,855,725 A | 8/1989 | Fernandez |
| 4,868,912 A | 9/1989 | Doering |
| 4,868,919 A | 9/1989 | Tanaka et al. |
| 4,923,401 A | 5/1990 | Marshall et al. |
| 4,952,918 A | 8/1990 | Fujita et al. |
| 4,973,960 A | 11/1990 | Mount, II |
| 5,010,323 A | 4/1991 | Hoffman |
| 5,063,600 A * | 11/1991 | Norwood .................... 382/186 |
| 5,070,467 A | 12/1991 | Todome |
| 5,105,544 A | 4/1992 | Ontiveros et al. |
| 5,134,389 A | 7/1992 | Furuta et al. |
| 5,138,304 A | 8/1992 | Bronson |
| 5,149,919 A | 9/1992 | Greanias et al. |
| 5,150,457 A | 9/1992 | Behm et al. |
| 5,151,688 A | 9/1992 | Tanaka et al. |
| 5,179,368 A | 1/1993 | Lippincott |
| 5,187,467 A | 2/1993 | Myers |
| 5,202,828 A | 4/1993 | Vertelney et al. |
| 5,231,698 A | 7/1993 | Forcier |
| 5,239,152 A | 8/1993 | Caldwell et al. |
| 5,243,149 A | 9/1993 | Comerford et al. |
| 5,250,929 A | 10/1993 | Hoffman et al. |
| RE34,476 E | 12/1993 | Norwood |
| 5,283,557 A | 2/1994 | Memarzadeh |
| 5,311,302 A | 5/1994 | Berry et al. |
| 5,315,129 A | 5/1994 | Forrest et al. |
| 5,315,667 A | 5/1994 | Fujisaki et al. |
| 5,353,016 A | 10/1994 | Kurita et al. |
| 5,402,151 A | 3/1995 | Duwaer |
| 5,422,812 A | 6/1995 | Knoll et al. |
| 5,448,263 A | 9/1995 | Martin |
| 5,495,581 A | 2/1996 | Tsai |
| 5,555,354 A | 9/1996 | Strasnick et al. |
| 5,555,555 A | 9/1996 | Sato et al. |
| 5,572,643 A | 11/1996 | Judson |
| 5,597,183 A | 1/1997 | Johnson |
| 5,600,348 A | 2/1997 | Bartholow et al. |
| 5,624,265 A | 4/1997 | Redford et al. |
| 5,640,193 A | 6/1997 | Wellner |
| 5,646,650 A | 7/1997 | Miller et al. |
| 5,654,529 A | 8/1997 | Yeung et al. |
| 5,668,576 A | 9/1997 | Ikura et al. |
| 5,691,749 A | 11/1997 | Sugiyama |
| 5,692,073 A | 11/1997 | Cass |
| 5,703,436 A | 12/1997 | Forrest et al. |
| 5,706,030 A | 1/1998 | Ishigami et al. |
| 5,717,435 A | 2/1998 | Fukushima et al. |
| 5,737,740 A | 4/1998 | Henderson et al. |
| 5,739,814 A | 4/1998 | Ohara et al. |
| 5,742,279 A | 4/1998 | Yamamoto et al. |
| 5,757,026 A | 5/1998 | Forrest et al. |
| 5,757,139 A | 5/1998 | Forrest et al. |
| 5,811,833 A | 9/1998 | Thompson |
| 5,818,425 A | 10/1998 | Want et al. |
| 5,834,893 A | 11/1998 | Bulovic et al. |
| 5,844,363 A | 12/1998 | Gu et al. |
| 5,850,214 A | 12/1998 | McNally et al. |
| 5,861,219 A | 1/1999 | Thompson et al. |
| 5,861,885 A | 1/1999 | Strasnick et al. |
| 5,870,767 A | 2/1999 | Kraft, IV |
| 5,877,752 A | 3/1999 | Puthuff et al. |
| 5,897,648 A | 4/1999 | Henderson |
| 5,903,729 A | 5/1999 | Reber et al. |
| 5,905,251 A | 5/1999 | Knowles |
| 5,915,285 A | 6/1999 | Sommer |
| 5,917,280 A | 6/1999 | Burrows et al. |
| 5,918,012 A | 6/1999 | Astiz et al. |
| 5,923,388 A | 7/1999 | Kurashima et al. |
| 5,929,834 A | 7/1999 | Inoue et al. |
| 5,932,895 A | 8/1999 | Shen et al. |
| 5,953,001 A | 9/1999 | Challener et al. |
| 5,953,587 A | 9/1999 | Forrest et al. |
| 5,957,695 A | 9/1999 | Redford et al. |
| 5,957,697 A | 9/1999 | Iggulden et al. |
| 5,959,616 A | 9/1999 | Challener |
| 5,965,981 A | 10/1999 | Inoguchi et al. |
| 5,984,362 A | 11/1999 | Christman |
| 5,986,401 A | 11/1999 | Thompson et al. |
| 5,990,869 A | 11/1999 | Kubica et al. |
| 5,995,084 A | 11/1999 | Chan et al. |
| 5,998,803 A | 12/1999 | Forrest et al. |
| 6,005,252 A | 12/1999 | Forrest et al. |
| 6,013,538 A | 1/2000 | Burrows et al. |
| 6,013,982 A | 1/2000 | Thompson et al. |
| 6,035,330 A | 3/2000 | Astiz et al. |
| 6,045,930 A | 4/2000 | Thompson et al. |
| 6,046,543 A | 4/2000 | Bulovic et al. |
| 6,048,630 A | 4/2000 | Burrows et al. |
| 6,067,080 A | 5/2000 | Holtzman |
| 6,081,261 A | 6/2000 | Wolff et al. |
| 6,097,376 A | 8/2000 | Rothschild et al. |
| 6,115,008 A | 9/2000 | Palalau et al. |
| 6,115,088 A | 9/2000 | Zhang et al. |
| 6,138,072 A | 10/2000 | Nagai |
| 6,148,260 A | 11/2000 | Musk et al. |
| 6,150,043 A | 11/2000 | Thompson et al. |
| 6,154,213 A | 11/2000 | Rennison et al. |
| 6,166,834 A | 12/2000 | Taketomi et al. |
| 6,167,382 A | 12/2000 | Sparks et al. |
| 6,181,301 B1 | 1/2001 | Inoguchi et al. |
| 6,185,683 B1 | 2/2001 | Ginter et al. |
| 6,212,297 B1 | 4/2001 | Sklarew |
| 6,256,009 B1 | 7/2001 | Lui et al. |
| 6,256,638 B1 | 7/2001 | Dougherty |
| 6,256,649 B1 | 7/2001 | Mackinlay et al. |
| 6,279,014 B1 * | 8/2001 | Schilit et al. .................. 715/234 |
| 6,282,539 B1 | 8/2001 | Luca |
| 6,297,804 B1 | 10/2001 | Kishitani |
| 6,304,898 B1 | 10/2001 | Shiigi |
| 6,322,262 B1 | 11/2001 | Trosterud |
| 6,326,946 B1 | 12/2001 | Moran et al. |
| 6,330,976 B1 | 12/2001 | Dymetman et al. |
| 6,343,138 B1 | 1/2002 | Rhoads |
| 6,343,273 B1 | 1/2002 | Nahan et al. |
| 6,343,283 B1 | 1/2002 | Saito et al. |
| 6,353,850 B1 | 3/2002 | Wies et al. |
| 6,356,923 B1 | 3/2002 | Yano et al. |
| 6,389,541 B1 | 5/2002 | Patterson |
| 6,396,598 B1 * | 5/2002 | Kashiwagi et al. .......... 358/474 |
| 6,407,757 B1 | 6/2002 | Ho |
| 6,424,094 B1 | 7/2002 | Feldman |
| 6,429,846 B2 | 8/2002 | Rosenberg et al. |
| 6,448,979 B1 | 9/2002 | Schena et al. |
| 6,512,840 B1 | 1/2003 | Tognazzini |
| 6,537,324 B1 | 3/2003 | Tabata et al. |
| 6,546,397 B1 | 4/2003 | Rempell |
| 6,587,859 B2 | 7/2003 | Dougherty et al. |

(56) References Cited

U.S. PATENT DOCUMENTS

| | | | |
|---|---|---|---|
| 6,647,130 B2 | 11/2003 | Rhoads | |
| 6,650,889 B1 | 11/2003 | Evans et al. | |
| 6,674,425 B1 | 1/2004 | Louis et al. | |
| 6,674,426 B1 | 1/2004 | McGee et al. | |
| 6,681,045 B1 | 1/2004 | Lapstun et al. | |
| 6,738,049 B2 | 5/2004 | Kiser et al. | |
| 6,752,317 B2 | 6/2004 | Dymetman et al. | |
| 6,762,775 B2 | 7/2004 | Ho | |
| 6,771,283 B2 | 8/2004 | Carro | |
| 6,788,293 B1 | 9/2004 | Silverbrook et al. | |
| 6,798,907 B1 * | 9/2004 | Clary et al. | 382/187 |
| 6,814,642 B2 | 11/2004 | Siwinski et al. | |
| 6,824,066 B2 | 11/2004 | Weyant | |
| 6,904,570 B2 | 6/2005 | Foote et al. | |
| 6,940,491 B2 | 9/2005 | Incertis Carro | |
| 6,963,334 B1 | 11/2005 | Stevens et al. | |
| 6,976,220 B1 | 12/2005 | Lapstun et al. | |
| 6,980,202 B2 | 12/2005 | Carro | |
| 7,003,308 B1 | 2/2006 | Fuoss et al. | |
| 7,027,038 B2 | 4/2006 | Carro | |
| 7,050,835 B2 * | 5/2006 | Hack et al. | 455/566 |
| 7,116,316 B2 | 10/2006 | Jelinek et al. | |
| 7,181,502 B2 | 2/2007 | Incertis | |
| 7,310,779 B2 | 12/2007 | Carro | |
| 7,373,588 B2 | 5/2008 | Carro | |
| 7,472,338 B2 | 12/2008 | Carro | |
| 7,530,023 B2 | 5/2009 | Carro | |
| 7,574,407 B2 | 8/2009 | Carro et al. | |
| 7,747,949 B2 | 6/2010 | Incertis Carro | |
| 2001/0039587 A1 | 11/2001 | Uhler et al. | |
| 2001/0053252 A1 | 12/2001 | Creque | |
| 2001/0056439 A1 | 12/2001 | Carro | |
| 2002/0013129 A1 | 1/2002 | Davies | |
| 2002/0047870 A1 | 4/2002 | Carro | |
| 2002/0057836 A1 | 5/2002 | Lui et al. | |
| 2002/0076111 A1 | 6/2002 | Dance et al. | |
| 2002/0078088 A1 * | 6/2002 | Kuruoglu et al. | 707/512 |
| 2002/0083090 A1 | 6/2002 | Jeffrey et al. | |
| 2002/0087598 A1 | 7/2002 | Carro | |
| 2002/0101447 A1 | 8/2002 | Carro | |
| 2002/0116477 A1 | 8/2002 | Somashekar et al. | |
| 2002/0152216 A1 | 10/2002 | Bouthors | |
| 2002/0152236 A1 | 10/2002 | Incertis-Carro | |
| 2002/0184332 A1 | 12/2002 | Kindberg et al. | |
| 2003/0001899 A1 | 1/2003 | Partanen et al. | |
| 2003/0002068 A1 | 1/2003 | Constantin et al. | |
| 2003/0006913 A1 | 1/2003 | Joyce et al. | |
| 2003/0024975 A1 | 2/2003 | Rajasekharan | |
| 2003/0030839 A1 | 2/2003 | Walters et al. | |
| 2003/0048487 A1 | 3/2003 | Johnston et al. | |
| 2003/0103238 A1 | 6/2003 | MacLean et al. | |
| 2003/0117378 A1 | 6/2003 | Carro | |
| 2003/0117379 A1 | 6/2003 | Carro | |
| 2003/0130952 A1 | 7/2003 | Bell et al. | |
| 2003/0191852 A1 | 10/2003 | Incertis | |
| 2004/0167895 A1 | 8/2004 | Carro | |
| 2004/0262051 A1 | 12/2004 | Carro | |
| 2005/0028092 A1 | 2/2005 | Carro | |
| 2006/0065859 A1 | 3/2006 | Lapstun et al. | |
| 2006/0167754 A1 | 7/2006 | Carro et al. | |
| 2007/0228177 A1 | 10/2007 | Lapstun et al. | |
| 2008/0017422 A1 | 1/2008 | Carro | |
| 2009/0013247 A1 | 1/2009 | Carro | |
| 2009/0299871 A1 | 12/2009 | Carro et al. | |

FOREIGN PATENT DOCUMENTS

| | | |
|---|---|---|
| EP | 1186986 | 3/2002 |
| JP | 1195316 | 8/1989 |
| JP | 01195318 | 8/1989 |
| JP | 0515075 | 2/1993 |
| JP | 05145724 | 6/1993 |
| JP | 05-189185 | 7/1993 |
| JP | 09046776 | 2/1997 |
| JP | 09305752 | 11/1997 |
| JP | 10040055 | 2/1998 |
| JP | 11134327 | 5/1999 |
| JP | 11-264972 | 9/1999 |
| JP | 2000056896 | 2/2000 |
| JP | 2000125024 | 4/2000 |
| JP | 2000172402 | 6/2000 |
| JP | 2002091827 | 3/2002 |
| JP | 20020099743 | 4/2002 |
| WO | 98/38761 | 9/1998 |
| WO | 00/72460 | 11/2000 |
| WO | 00/73981 | 12/2000 |
| WO | 01/77795 | 10/2001 |
| WO | 01/83213 | 11/2001 |
| WO | 02/052488 | 7/2002 |
| WO | 03/042862 | 5/2003 |

OTHER PUBLICATIONS

Notice of Allowance (dated Nov. 14, 2005) for U.S. Appl. No. 10/818,790, filed Apr. 6, 2004; Confirmation No. 6013.

Non-Final Office Action (dated Sep. 7, 2004) for U.S. Appl. No. 10/028,218, filed Oct. 25, 2001; Confirmation No. 2533.

Response (File Date Dec. 2, 2005) to Non-Final Office Action (dated Sep. 7, 2004) for U.S. Appl. No. 10/028,218, filed Oct. 25, 2001; Confirmation No. 2533.

Non-Final Office Action (dated Jan. 4, 2005) for U.S. Appl. No. 10/028,218, filed Oct. 25, 2001; Confirmation No. 2533.

Response (File Date Feb. 10, 2005) to Non-Final Office Action (dated Jan. 4, 2005) for U.S. Appl. No. 10/028,218, filed Oct. 25, 2001; Confirmation No. 2533.

Terminal Disclaimer (File Date Feb. 10, 2005) for U.S. Appl. No. 10/028,218, filed Oct. 25, 2001; Confirmation No. 2533.

Notice of Allowance (dated Feb. 25, 2005) to Non-Final Office Action (dated Jan. 4, 2005) for U.S. Appl. No. 10/028,218, filed Oct. 25, 2001; Confirmation No. 2533.

Non-Final Office Action (dated Apr. 4, 2008) for U.S. Appl. No. 10/495,236, filed Oct. 4, 2004; Confirmation No. 1587.

Response (File Date Jun. 26, 2008) to Non-Final Office Action (dated Apr. 4, 2008) for U.S. Appl. No. 10/495,236, filed Oct. 4, 2004; Confirmation No. 1587.

Final Office Action (dated Oct. 15, 2008) for U.S. Appl. No. 10/495,236, filed Oct. 4, 2004; Confirmation No. 1587.

Response (File Date Dec. 5, 2008) to Final Office Action (dated Oct. 15, 2008) for U.S. Appl. No. 10/495,236, filed Oct. 4, 2004; Confirmation No. 1587.

Terminal Disclaimer (File Date Dec. 5, 2008) to U.S. Appl. No. 10/495,236, filed Oct. 4, 2004; Confirmation No. 1587.

Notice of Allowance (dated Dec. 30, 2008) for U.S. Appl. No. 10/495,236, filed Oct. 4, 2004; Confirmation No. 1587.

International Preliminary Examination Report in Application No. PCT/EP02/11126 dated Nov. 24, 2003.

International Search Report in Application No. PCT/EP02/11126 dated Sep. 12, 2003.

Tang, C. et al., "Brightness on Display", http://oemagazine.com/fromTheMagazine/feb01/brightness.html, OE Magazine, Jun. 10, 2004, 8 pages.

Flynn, R. et al., "Multimedia—An Introduction", IBM Journal of Research Development, vol. 42, No. 2, Mar. 1998, p. 165-176.

Topponnier, A. et al., "Useful links about OLED", http://www.krayenbuhl.com/index.php?location-axelle_oled, Jun. 10, 2004, 6 pages.

Libsch, F. et al., "Understanding crosstalk in high-resolution color thin-film-transistor liquid crystal displays", IBM Journal of Research Development, vol. 42, No. 3/4, 1998, 14 pages.

Mark, W., "Turning pervasive computing into mediated spaces", IBM Systems Journal, vol. 38, No. 4, 1999, pp. 677-692.

"Scientists Develop New Material for Efficient Flat-Panel Displays", http://www.princeton.edu/pr/news/00/q1/0217-display.htm, News from Princeton University, Feb. 17, 2000, pp. 1-2.

"Science and Technology of Organic Electroluminescent Devices", http://www.mrs.org/meetings/spring98/absbook/AbstractBookG.html, Symposium G, Apr. 12-15, 1998, 19 pages.

(56) References Cited

OTHER PUBLICATIONS

"High-Resolution Displays" IBM Journal of Research and Development, vol. 42, No. 3/4, 1998, 240 pages.
Robinson, J. et al., "The LivePaperSystem: Augmenting Paper on an Enhanced Tabletop", Computers and Graphics, vol. 25, No. 5 Oct. 2001, pp. 731-743.
Non-Final Office Action (dated Nov. 29, 2004) for U.S. Appl. No. 10/317,524, filed Dec. 12, 2002; Confirmation No. 6599.
Response (File Date Feb. 22, 2005) to Non-Final Office Action (dated Nov. 29, 2004) for U.S. Appl. No. 10/317,524, filed Dec. 12, 2002; Confirmation No. 6599.
Notice of Allowance (dated Jun. 13, 2005) for U.S. Appl. No. 10/317,524, filed Dec. 12, 2002; Confirmation No. 6599.
Non-Final Office Action (dated Mar. 2, 2006) for U.S. Appl. No. 10/295,683, filed Nov. 15, 2002; Confirmation No. 2284.
Response (File Date Mar. 23, 2006) to Non-Final Office Action (dated Mar. 2, 2006) for U.S. Appl. No. 10/295,683, filed Nov. 15, 2002; Confirmation No. 2284.
Final Office Action (dated May 23, 2006) for U.S. Appl. No. 10/295,683, filed Nov. 15, 2002; Confirmation No. 2284.
Response (File Date Aug. 22, 2006) to Final Office Action (dated May 23, 2006) for U.S. Appl. No. 10/295,683, filed Nov. 15, 2002; Confirmation No. 2284.
Supplemental Amendment/Terminal Disclaimer (Filed Date Aug. 24, 2006) for U.S. Appl. No. 10/295,683, filed Nov. 15, 2002; Confirmation No. 2284.
Notice of Allowance (dated Sep. 21, 2006) for U.S. Appl. No. 10/295,683, filed Nov. 15, 2002; Confirmation No. 2284.
Non-Final Office Action (dated Jan. 9, 2008) for U.S. Appl. No. 10/530,535, filed Apr. 6, 2005; Confirmation No. 4718.
Response (File Date Apr. 18, 2008) to Non-Final Office Action (dated Jan. 9, 2008) for U.S. Appl. No. 10/530,535, filed Apr. 6, 2005; Confirmation No. 4718.
Final Office Action (dated Sep. 3, 2008) for U.S. Appl. No. 10/530,535, filed Apr. 6, 2005; Confirmation No. 4718.
Response (File Date Oct. 31, 2008) to Final Office Action (dated Sep. 3, 2008) for U.S. Appl. No. 10/530,535, filed Apr. 6, 2005; Confirmation No. 4718.
Advisory Action (dated Nov. 14, 2008) for U.S. Appl. No. 10/530,535, filed Apr. 6, 2005; Confirmation No. 4718.
Notice of Appeal (File Date Dec. 1, 2008) for U.S. Appl. No. 10/530,535, filed Apr. 6, 2005; Confirmation No. 4718.
Appeal Brief (File Date Dec. 5, 2008) for U.S. Appl. No. 10/530,535, filed Apr. 6, 2005; Confirmation No. 4718.
Notice of Allowance (dated Mar. 31, 2009) for U.S. Appl. No. 10/530,535, filed Apr. 6, 2005; Confirmation No. 4718.
Carro, F., "Light pen to use with a transparent electro-luminiscent display", Nov. 30, 2002, 4 pages.
Harding, R., "Computer Interactive Texts", Proceedings of the Fourth Annual International Conference on Technology in Collegiate Mathematics, Addison-Wesley, 1993, 10 pages.
Non-Final Office Action (dated Sep. 13, 2010) for U.S. Appl. No. 12/537,480, filed Aug. 7, 2009; Confirmation No. 5435.
Response (File Date Dec. 3, 2010) to Non-Final Office Action (date Sep. 13, 2010) for U.S. Appl. No. 12/537,480, filed Aug. 7, 2009; Confirmation No. 5435.
Non-Final Office Action (dated Jan. 24, 2011) for U.S. Appl. No. 12/537,480, filed Aug. 7, 2009; Confirmation No. 5435.
Terminal Disclaimer {File Date Apr. 13, 2011) for U.S. Appl. No. 12/536,480, filed Aug. 7, 2009; Confirmation No. 5435.
Non-Final Office Action (dated Jul. 14, 2003) for U.S. Appl. No. 09/782,144, filed Feb. 13, 2001; Confirmation No. 9830.
Response (File Date Oct. 20, 2003) to Non-Final Office Action (dated Jul. 14, 2003) for U.S. Appl. No. 09/782,144, filed Feb. 13, 2001; Confirmation No. 9830.
Final Office Action (dated Nov. 26, 2003) for U.S. Appl. No. 09/782,144, filed Feb. 13, 2001; Confirmation No. 9830.
Response (File Date Feb. 2, 2004) to Final Office Action (dated Nov. 26, 2003) for U.S. Appl. No. 09/782,144, filed Feb. 13, 2001; Confirmation No. 9830.

Advisory Action (dated Feb. 19, 2004) for U.S. Appl. No. 09/782,144, filed Feb. 13, 2001; Confirmation No. 9830.
Robinson et al., "A Framework for Interacting with Paper", http://www.cl.cam.ac.uk/research/origami/Origami1997c/index.html, Eurographics, vol. 16, No. 3, 1997, pp. 1-9.
Meyer, A., "Pen Computing: A Technology Overview and a Vision," ACM SIGCHI Bulletin, vol. 27, No. 3, Jul. 1995, pp. 46-90.
Non-Final Office Action (dated Jan. 24, 2007) for U.S. Appl. No. 10/786,201, filed Feb. 25, 2004; Confirmation No. 3700.
Notice of Appeal (File Date Apr. 16, 2007) for U.S. Appl. No. 10/786,201, filed Feb. 25, 2004; Confirmation No. 3700.
Advisory Action (dated May 1, 2007) for U.S. Appl. No. 10/786,201, filed Feb. 25, 2004; Confirmation No. 3700.
Response (File Date Jun. 18, 2007) to Non-Final Office Action (dated Jan. 24, 2007) for U.S. Appl. No. 10/786,201, filed Feb. 25, 2004; Confirmation No. 3700.
Final Office Action (dated Jul. 31, 2007) for U.S. Appl. No. 10/786,201, filed Feb. 25, 2004; Confirmation No. 3700.
Notice of Appeal (File Date Oct. 31, 2007) for U.S. Appl. No. 10/786,201, filed Feb. 25, 2004; Confirmation No. 3700.
Notice of Allowance (dated Jan. 24, 2008) for U.S. Appl. No. 10/786,201, filed Feb. 25, 2004; Confirmation No. 3700.
Non-Final Office Action (dated Nov. 24, 2003) for U.S. Appl. No. 09/841,930, filed Apr. 25, 2001; Confirmation No. 6591.
Response (File Date Feb. 27, 2004) to Non-Final Office Action (dated Nov. 24, 2003) for U.S. Appl. No. 09/841,930, filed Apr. 25, 2001; Confirmation No. 6591.
Notice of Allowance (dated Mar. 22, 2004) for U.S. Appl. No. 09/841,930, filed Apr. 25, 2001; Confirmation No. 6591.
Jacobson J. et al., "The Last Book", IBM Systems Journal, vol. 36, No. 3, 1997, MIT Media Laboratory, pp. 457-463.
Kelley J. et al., "Extending User-Centered Methods Beyond Interface Design to Functional Definition", Proceedings of the Human Factors and Ergonomics Society, IBM T.J. Watson Research Center, Yorktown Heights, New York. 40th Annual Meeting held in Philadelphia, Sep. 1996. 10 pages.
"Pervasive Computing", IBM Systems Journal, vol. 38, No. 4, 1999. pp. 502-503.
"Digital multimedia technology", IBM Journal of Research and Development, vol. 43, No. 4, Jul. 1999, pp. 450-452.
"Multimedia systems", IBM Journal of Research and Development, vol. 42, No. 2, Mar. 1998, pp. 162-164.
Alt P. et al., "Increasing electronic display information content: An introduction", IBM Journal of Research and Development, vol. 42, No. 3/4, May/Jul. 1998, pp. 315-320.
"Light Emitting Polymers Technology Backgrounder", http://www.cdtltd.co.uk, CDT Ltd, 2000, pp. 1-5.
"What is User Interface?", http://www-3.ibm.com/ibm/easy/eou_ext.nsf/Publish/568, IBM-Ease of Use, Nov. 21, 2011, 1 page.
"TouchTek4 by MicroTouch", http://www.microtouch.com, 3M Touch Systems, Nov. 19, 2011, 2 pages.
"IBM Monitors and Touch by MicroTouch . . . A Perfect Match", http://web.archive.org/web/20000815095939/http://www.microtouch.com, MicroTouch—IBM Partnership, Nov. 20, 2011, pp. 1-2.
"MicroTouch IBM Touch Monitor Solution.", http://web.archive.org/web/20010215034326/http://www.microtouch.co . . . , Microtouch, Nov. 19, 2011, pp. 1-3.
"IBM Flat Panel Touch Monitors.", http://web.archive.org/web/20010215034326/http://www.microtouch.com/mthtml/03c2a_ibm-alliance-mon.htm, MicroTouch, Feb. 15, 2001, pp. 1-3.
"Toted Technology", http:l/www.universaldisplay.com/toled.html, Universal Display Corporation, 1998, pp. 1-2.
Non-Final Office Action (dated Oct. 14, 2004) for U.S. Appl. No. 09/892,399, filed Jun. 26, 2001; Confirmation No. 2163.
Response (File Date Jan. 19, 2005) to Non-Final Office Action (dated Oct. 14, 2004) for U.S. Appl. No. 09/892,399, filed Jun. 26, 2001; Confirmation No. 2163.
Final Office Action (dated Apr. 27, 2005) for U.S. Appl. No. 09/892,399, filed Jun. 26, 2001; Confirmation No. 2163.
Response (File Date Jun. 17, 2005) to Final Office Action (dated Apr. 27, 2005) for U.S. Appl. No. 09/892,399, filed Jun. 26, 2001; Confirmation No. 2163.

(56) References Cited

OTHER PUBLICATIONS

Advisory Action (dated Jul. 5, 2005) for U.S. Appl. No. 09/892,399, filed Jun. 26, 2001; Confirmation No. 2163.
Response (File Date Jul. 18, 2005) to Final Office Action (dated Apr. 27, 2005) for U.S. Appl. No. 09/892,399, filed Jun. 26, 2001; Confirmation No. 2163.
Non-Final Office Action (dated Oct. 3, 2005) for U.S. Appl. No. 09/892,399, filed Jun. 26, 2001; Confirmation No. 2163.
Response (File Date Jan. 3, 2006) to Non-Final Office Action (dated Oct. 3, 2005) for U.S. Appl. No. 09/892,399, filed Jun. 26, 2001; Confirmation No. 2163.
Final Office Action (dated Mar. 15, 2006) for U.S. Appl. No. 09/892,399, filed Jun. 26, 2001; Confirmation No. 2163.
Response (File Date May 18, 2006) to Final Office Action (dated Mar. 15, 2006) for U.S. Appl. No. 09/892,399, filed Jun. 26, 2001; Confirmation No. 2163.
Advisory Action (dated Jun. 7, 2006) for U.S. Appl. No. 09/892,399, filed Jun. 26, 2001; Confirmation No. 2163.
Notice of Appeal (File Date Jun. 15, 2006) for U.S. Appl. No. 09/892,399, filed Jun. 26, 2001; Confirmation No. 2163.
Appeal Brief (File Date Aug. 9, 2006) for U.S. Appl. No. 09/892,399, filed Jun. 26, 2001; Confirmation No. 2163.
Reply Brief (File Date Dec. 22, 2006) for U.S. Appl. No. 09/892,399, filed Jun. 26, 2001; Confirmation No. 2163.
Notice of Allowance (dated Jul. 11, 2008) for U.S. Appl. No. 09/892,399, filed Jun. 26, 2001; Confirmation No. 2163.
Arai T. et al., "PaperLink: A Technique for Hyperlinking from Real Paper to Electronic Content", Mar. 22, 1997, pp. 327-334.
Newman W. et al., "A Desk Supporting Computer-based Interaction with Paper Documents", Rank Xerox EuroPARC, May 3-7, 1992, pp. 587-592.
Grasso A. et al., "Augmenting Paper to Enhance Community Information Sharing", ACM, 2000, pp. 51-62.
Non-Final Office Action (dated May 26, 2005) for U.S. Appl. No. 09/923,150, filed Aug. 6, 2001; Confirmation No. 8930.
IBM ThinkPad TransNote; Articled titled "A Remarkable computer that didn't make it"; published Mar. 20, 2002.
IBM Press room; "IBM Announces Delivery of ThinkPad TransNote, World's First Portfolio Notebook Computer"; Mar. 20, 2001.
Response (File Date Apr. 13, 2011) to Non-Final Office Action (dated Jan. 24, 2011) for U.S. Appl. No. 12/537,480, filed Aug. 7, 2009; Confirmation No. 5435.
Notice of Allowance (dated Jun. 2, 2011) for U.S. Appl. No. 12/537,480, filed Aug. 7, 2009; Confirmation No. 5435.
Response (File Date Aug. 2, 2011) to Notice of Allowance (dated Jun. 2, 2011) for U.S. Appl. No. 12/537,480, filed Aug. 7, 2009; Confirmation No. 5435.
Notice of Allowance (dated Aug. 22, 2011) for U.S. Appl. No. 12/537,480, filed Aug. 7, 2009; Confirmation No. 5435.
Non-Final Office Action (dated Jul. 21, 2009) for U.S. Appl. No. 10/562,093, filed Dec. 21, 2005; Confirmation No. 8123.
Response (File Date Oct. 13, 2009) to Non-Final Office Action (dated Jul. 21, 2009) for U.S. Appl. No. 10/562,093, filed Dec. 21, 2005; Confirmation No. 8123.
Notice of Allowance (dated Feb. 17, 2010) for U.S. Appl. No. 10/562,093, filed Dec. 21, 2005; Confirmation No. 8123.
Heiner, J. et al., "Linking and Messaging from Real Paper in the Paper PDA", ACM, 1999, pp. 179-186.
Siio, I. et al., "Real-world Interaction using the FieldMouse", ACM, 1999, pp. 113-119.
Benson, P., "The More Things Change . . . Paper Is Still With Us", http://www.press.umich.edu/jep/07-02/benson0702.html, Journal of Electronic Publishing, University of Michigan Press, vol. 7, Issue 2, Dec. 2001, pp. 1-7.
McKnight, C., "Electronic Journals: What Do Users Think of Them?", http://www.dl.slis.tsukuba.ac.jp/ISDL97/proceedings/mcknight.html, Department of Information and Library Studies, Nov. 28, 2011, pp. 1-7.
O'Hara, K. et al., "A Comparison of Reading Paper and On-Line Documents", Xerox, Proceedings of CHI '97, Human Factors in Computing Systems, Mar. 22-27, 1997, 10 pages.
Light, A., "Fourteen Users in Search of a Newspaper: the Effect of Expectation on Online Behaviour", School of Cognitive and Computing Sciences, University of Sussex, CSRP 507, Nov. 28, 2011, pp. 1-13.
"PL Series, LCD pen tablet systems", http://www.wacom.com/lcdtablets/, WACOM, Nov. 28, 2011, 1 page.
"Science, Technology, Invention in History: Impact, Influence, Change", Bright Ideas, National Archives of NHD 1999, Sep. 11, 2002, pp. 1-3.
Schilit, B. et al., "Digital Library Information Appliances", Proceedings of Digital Libraries '98, Third ACM Conference on Digital Libraries, Jun. 23-26, 1998, 10 pages.
Non-Final Office Action (dated Mar. 13, 2007) for U.S. Appl. No. 10/818,790, filed Apr. 6, 2004; Confirmation No. 6013.
Response (File Date May 18, 2007) to Non-Final Office Action (dated Mar. 13, 2007) for U.S. Appl. No. 10/818,790, filed Apr. 6, 2004; Confirmation No. 6013.
Notice of Allowance (dated Aug. 13, 2007) for U.S. Appl. No. 10/818,790, filed Apr. 6, 2004; Confirmation No. 6013.
"Introduction to Image Maps", http://www.ryerson.ca/mps024/notes/imagemaps, MPS 024 Digital Applications, Mar. 23, 2007, pp. 1-4.
"System and method for providing and accessing information related with visually distinctive physical items", IBM, IPCOM000020374D, Nov. 18, 2003, 3 pages.
Miller, M., "The Complete Idiot's Guide to Online Search Secrets", Que, Mar. 5, 2007, 5 pages.
Hayes, D., "Sams Teach Yourself HTML 4 in 10 Minutes", SAMS, Sams Publishing, Mar. 6, 2007, 12 pages.
"Yahoo!", http://web.archive.org/web/19981212034334/http://www11.yahoo.com/, Mar. 6, 2007, 2 pages.
"AltaVista Babelfish", http://web.archivel.org/web/19981212012730/http://babelfish.altavista.com/, Mar. 5, 2007, 1 page.
Non-Final Office Action (dated Jan. 4, 2011) for U.S. Appl. No. 11/842,192, filed Aug. 21, 2007; Confirmation No. 2944.
Response (File Date Mar. 28, 2011) to Non-Final Office Action (dated Jan. 4, 2011) for U.S. Appl. No. 11/842,192, filed Aug. 21, 2007; Confirmation No. 2944.
Final Office Action (dated Jun. 8, 2011) for U.S. Appl. No. 11/842,192, filed Aug. 21, 2007; Confirmation No. 2944.
Terminal Disclaimer (File Date Sep. 6, 2011) for U.S. Appl. No. 11/842,192, filed Aug. 21, 2007; Confirmation No. 2944.
Response (File Date Sep. 6, 2011) to Final Office Action (dated Jun. 8, 2011) for U.S. Appl. No. 11/842,192, filed Aug. 21, 2007; Confirmation No. 2944.
Notice of Allowance (dated Oct. 6, 2011) for U.S. Appl. No. 11/842,192, filed Aug. 21, 2007; Confirmation No. 2944.
Manohar, N. et al., "A framework for programmable overlay multimedia networks", IBM Journal of Research Development, vol. 43, No. 4, Jul. 1999, pp. 555-577.
"Cooltown beacons", http://cooltown.hp.com/beacon_ful.htm, Nov. 18, 2011, pp. 1-2.
"Cooltown", http://cooltown.hp.com/cooltownhome/index.asp, hewlett-packard company, Nov. 18, 2011, 1 page.
"Light pen to use with a tarnsparent electro-luminiscent display", IBM, IPCOM000016405D, Nov. 30, 2002, 4 pages.
"UDC Demonstrates Felixible and Transparent Displays at Annual Meeting", http://web.archive.org/web/20040619140623/http://www.universaldisplay.com/press/press-2000-06-23.htm, Universal Display Corporation, Jun. 23, 2000, pp. 1-2.
"POEM Demos OLEDs to U.S. House of Congress", http://web.archive.org/web/20031016155339/http://www.poem.princeton.edu/news/spring96/article4.html, Oct. 16, 2003, 1 page.
Sheats, J. "Introduction to Organic Light-Emitting Diodes (OLEDs)", http://web.archive.org/web/20010125 1049/http://www.rolltronics.com/In . . . , Nov. 1, 2000, pp. 1-8.
Gu, G. et al., "A metal-free, full-color stacked organic light-emitting device", American Institute of Physics, Applied Physics Letters, vol. 74, No. 2, Jan. 11, 1999, pp. 305-306.
Forrest, S., "The dawn of organic electronics", http://www.spectrum.ieee.org/print/1578, IEEE Spectrum, Aug. 25, 2008, 1 page.

(56) References Cited

OTHER PUBLICATIONS

Response (File Date May 22, 2008) to Non-Final Office Action (dated Jan. 9, 2008) for U.S. Appl. No. 10/530,535, filed Apr. 6, 2005; Confirmation No. 4718.
BPAI Decision (dated Mar. 17, 2008) for U.S. Appl. No. 09/892,399, filed Jun. 26, 2001; Confirmation No. 2163.
Pre-Brief Conference request (dated Oct. 11, 2007) for U.S. Appl. No. 10/786,201, filed Feb. 25, 2004; Confirmation No. 3700.
Pre-Brief Appeal Conference decision (dated Dec. 14, 2007) for U.S. Appl. No. 10/786,201, filed Feb. 25, 2004; Confirmation No. 3700.
Pre-Brief Conference request (dated Apr. 16, 2007) for U.S. Appl. No. 10/786,201, filed Feb. 25, 2004; Confirmation No. 3700.
"Secret behind High Efficiency of Light Emitting Polymers disclosed", http://www.cdtltd.co.uk/press/archive_press_release_index/2001/140.asp, Cambridge Display Technology—Your Partner in Light Emitting Polymers, Nov. 13, 2011, pp. 1-2.
Scott J. et al., "Charge injection and transport in organic light emitting diodes", IBM Research, Science and Technology at Almaden, Jul. 1999, 1 page.
Forrest, S. et al., "The dawn of organic electronics", IEEE Spectrum, vol. 37, No. 8, Aug. 2000, 16 pages.
"The Official Bluetooth Wireless Info Site", Bluetooth.com, http://www.bluetooth.com/bluetooth, retrieved Mar. 2, 2007, 2 pages.
"Pen Technologies", IBM Research, http://www.research.ibm.com/electricInk, retrieved Mar. 12, 2007, 6 pages.

\* cited by examiner

DEVICE AND SYSTEM FOR RETRIEVING AND DISPLAYING HANDWRITTEN ANNOTATIONS

CROSS REFERENCE TO RELATED APPLICATION

This application is a divisional application of copending U.S. patent application Ser. No. 10/317,504 filed on Dec. 12, 2002, which claims priority to European Patent Application No. 01480138.5 filed on Dec. 21, 2001, the contents of which are incorporated herein by reference in their entireties.

FIELD OF THE INVENTION

The present invention generally relates to computer interfaces used to input information relating to a physical document. More particularly, the invention relates to a device for capturing and displaying handwritten annotations and a computer system using such a device.

BACKGROUND

For most people, handwriting on a physical medium is the most natural manner of recording information. Thus, digitizing tablets are commonly used as input devices for computer systems allowing the entry of handwritten information into a computer. Moreover, in the prior art, several techniques have been described using a transparent digitizing tablet superposed on a display device, such as an LCD screen. Such a device allows an electronic form to be displayed by the LCD screen, through the digitizing tablet, and the strokes or annotations produced by a pencil-like stylus on the digitizing tablet to be displayed on the underlying display device. An example of these techniques is described in U.S. Pat. No. 6,212,297, by Sklarew, entitled "Handwritten keyboardless entry computer system". Such a device is not adapted to be used with a physical document but only with an electronic document.

Other types of interfaces make it possible to write with real ink over a physical document, in paper form for example, superposed on a digitizing tablet. This latter is enabled to digitize and capture information handwritten on physical documents. However, such a method degrades the integrity of original physical documents since the document is marked with real ink annotations.

Accordingly, there exists a need in the art to overcome the deficiencies and limitations described hereinabove.

BRIEF SUMMARY

A main object of the present invention is to overcome the above-mentioned drawbacks and to propose a new apparatus and system adapted to associate additional information with physical documents while keeping intact the integrity of the physical documents.

In a first aspect, the present invention relates to an apparatus for capturing and displaying handwritten annotations, for use with a computer system, comprising a transparent digitizing tablet adapted to cooperate with a stylus in order to capture handwritten annotations. The apparatus comprises a transparent electro-luminescent display adapted to display captured handwritten annotations, said transparent digitizing tablet being superposed on said transparent electro-luminescent display.

Thanks to the transparent electro-luminescent display and the transparent digitizing tablet superposed thereon, handwritten annotations can be marked and displayed on a physical document without physically marking the document. Thus, a user can make annotations over a physical document using "electronic ink" so that what is being "written" by the user on the physical document (on the digitizing tablet) can appear to the user electronically illuminated by the transparent electro-luminiscent display, on the same physical document. Such an apparatus enables the user to draw, sketch, annotate, construct, outline, enhance, erase, associate and display information directly over physical documents while keeping intact the integrity of said physical documents.

In a second aspect of the invention, a system for capturing and displaying electronic handwritten annotations comprises: an apparatus as described above; a computer system; a stylus adapted to cooperate with a transparent digitizing tablet of said apparatus; said transparent digitizing tablet comprising means for digitizing annotations made by said stylus and means for sending digitized annotations to the computer system; said computer system comprising means for transmitting digitized annotations to the transparent electro-luminescent display of said apparatus; and said transparent electro-luminescent display comprising means for highlighting said digitized annotations. As mentioned above, such a system makes it possible to "write" over physical documents without physically marking said documents.

According to a preferred embodiment of the invention, the computer system comprises means for storing digitized annotations sent by the transparent digitizing tablet. The handwritten annotations are stored in order to be retrieved and displayed in the future by the same or another user. Moreover, a user can handwrite several pages over a single form without physically marking it, and store said handwritten annotations in a computer system for later use.

This information can be selectively displayed over the same form. According to a third aspect of the invention, a method for capturing and displaying handwritten annotations, using a system as described above comprises the following steps: digitizing annotations made by the stylus on the transparent digitizing tablet; sending digitized annotations to the computer system; transmitting digitized annotations to the transparent electro-luminescent display; and highlighting said digitized annotations.

According to a fourth aspect of the invention, a method for retrieving and displaying electronic handwritten annotations on a physical document, using a system as described above comprises the following steps: identifying a physical document; identifying digitized annotations stored in an annotation table associated with the identified document; and sending for display the digitized annotations to the transparent electro-luminescent display.

The invention also includes a computer program comprising computer readable instructions for carrying out the method for capturing and displaying handwritten annotations and/or the method for retrieving and displaying handwritten information according to the invention.

The method for capturing and displaying handwritten information, the method for retrieving and displaying handwritten information and the computer program present the same advantages and the same characteristics as the apparatus and system which perform them. Other features and advantages of the invention will also emerge from the following description.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
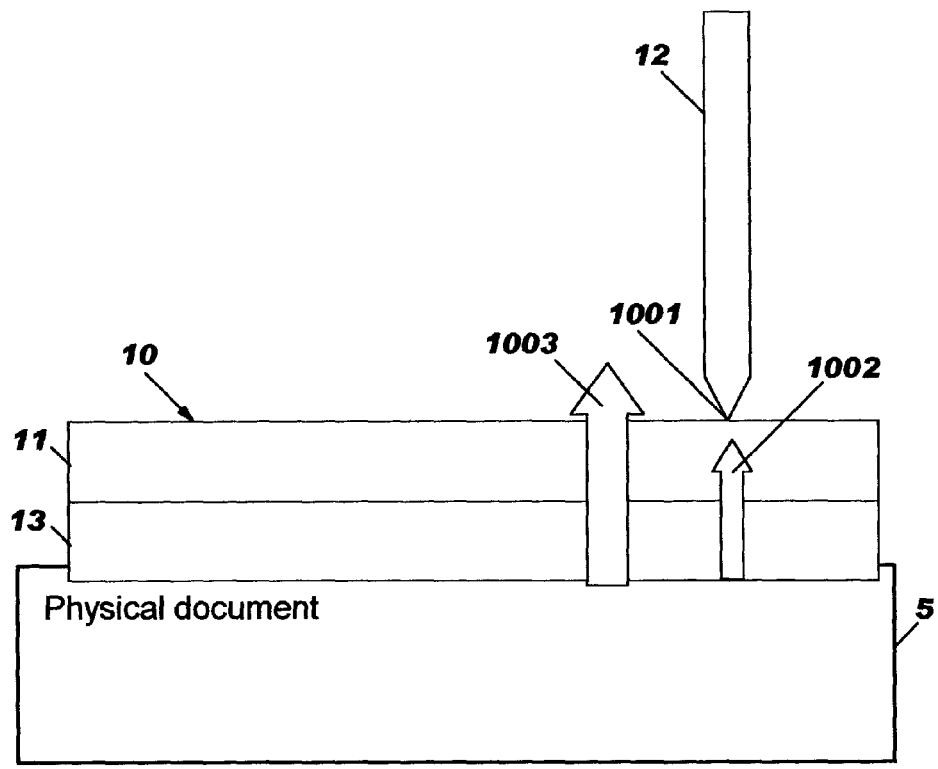
FIG. 1 is a schematic view of an apparatus for capturing and displaying handwritten annotations according to a first aspect of the invention.

Referring first to FIG. 1, a description will now be given of an apparatus for capturing and displaying handwritten annotations in accordance with the invention.

This apparatus 10 comprises a transparent digitizing tablet 11 adapted to cooperate with a stylus 12 in order to capture handwritten annotations. Such a transparent digitizing tablet 11 is commonly used to generate signals that are proportional to the coordinates of each point pressed by the stylus 12. Digitizing tablet 11 and stylus 12 can be considered as electronic equivalents of pencil and paper used for writing, drawing, tracing or sketching.

In a preferred embodiment of the invention, the digitizing tablet may be built from a substrate having a matrix formed by a plurality of first and second lines used to determine the position of the stylus 12 when the latter is applied to the tablet. The first lines correspond to a plurality of scanning lines and the second lines correspond to a plurality of data lines. These first and second lines are made from a transparent conductive material, for example from indium tin oxide (ITO). The application of the stylus to the tablet creates an electric signal, the succession of electric signals corresponding to a drawing on the tablet. An example of a transparent digitizing tablet that would be possible to use for implementing the present invention is produced by Wacom Technology Co. and sold under the name WACOM, PL Series, LCD pen tablet system. Such a tablet is used with a pen-like stylus. An example of a stylus that would be possible to use, in combination with the digitizing tablet, is Wacom's wireless, pressure sensitive ULTRAPEN sold by Wacom Technology Co.

According to the invention, the apparatus further comprises a transparent electro-luminescent display 13 adapted to display captured handwritten annotations. This display 13 is of the type of a transparent organic bright light-emitting device. In a preferred embodiment of the present invention, the display 13 comprises a substrate having an array or a mesh formed by a plurality of first and second lines. The first lines correspond to transparent scanning lines and the second lines correspond to transparent data lines. These first and second lines cross one other and an electro-luminescent element is located at each intersection of the scanning and data lines. Such a light-emitting display, with a passive matrix, may be made of an array of Transparent Organic Light Emitting Devices (TOLEDs), which are commonly used to create vision area displays on windshields, cockpits, and so forth. TOLEDs are today manufactured with standard silicon semiconductors. An example of light emitting foil technology that would be possible to use here is that used for the TOLEDs manufactured by UNIVERSAL DISPLAY CO.

In its basic form, a TOLED is a monolithic, solid-state device consisting in a series of molecules of small size forming organic thin films sandwiched between two transparent, conductive layers. When a voltage is applied across the device, it emits light. This light emission is based upon a luminescence phenomenon wherein electrons and holes are injected and migrate from the contacts toward the organic junction under the applied electric field. When these carriers meet, they form excitons (electron-hole pairs) that recombine radiatively to emit light. As a result, TOLEDs are bright and can be directed to emit from either or both surfaces of the sheet. This is possible because, in addition to the transparent contacts, the organic materials are also transparent over their own emission spectrum and throughout most of the visible spectrum. Moreover, TOLED displays can be nearly as clear as glass, since they can be up to 85% transparent when not energized.

As shown on FIG. 1, the transparent digitizing tablet 11 is superposed on the transparent electro-luminescent display 13. Thus, the apparatus comprises two superposed, functionally independent transparent foils. This apparatus consists in a portable transparent electro-luminescent digitizing tablet 10 which can be superposed on any kind of physical document 5.

A shown in FIG. 1, the electro-luminescent display 13 is adapted to emit light at the point 1001 that is pressed by the stylus (see the arrow 1002). Since the digitizing tablet superposed thereon is transparent, the light emitted by the display is transmitted through the tablet in order to appear on the top of the apparatus 10. Moreover, since this display is transparent, it is also adapted to transmit light (see the arrow 1003) from the physical document 5 through both the display 13 and the tablet 11, so that the surface of the physical document 5 is visible on unmarked areas. Consequently, such an apparatus is perfectly adapted to write annotations in "electronic ink" and to display these annotations over the document 5, without physically marking the document.

Figure 2:
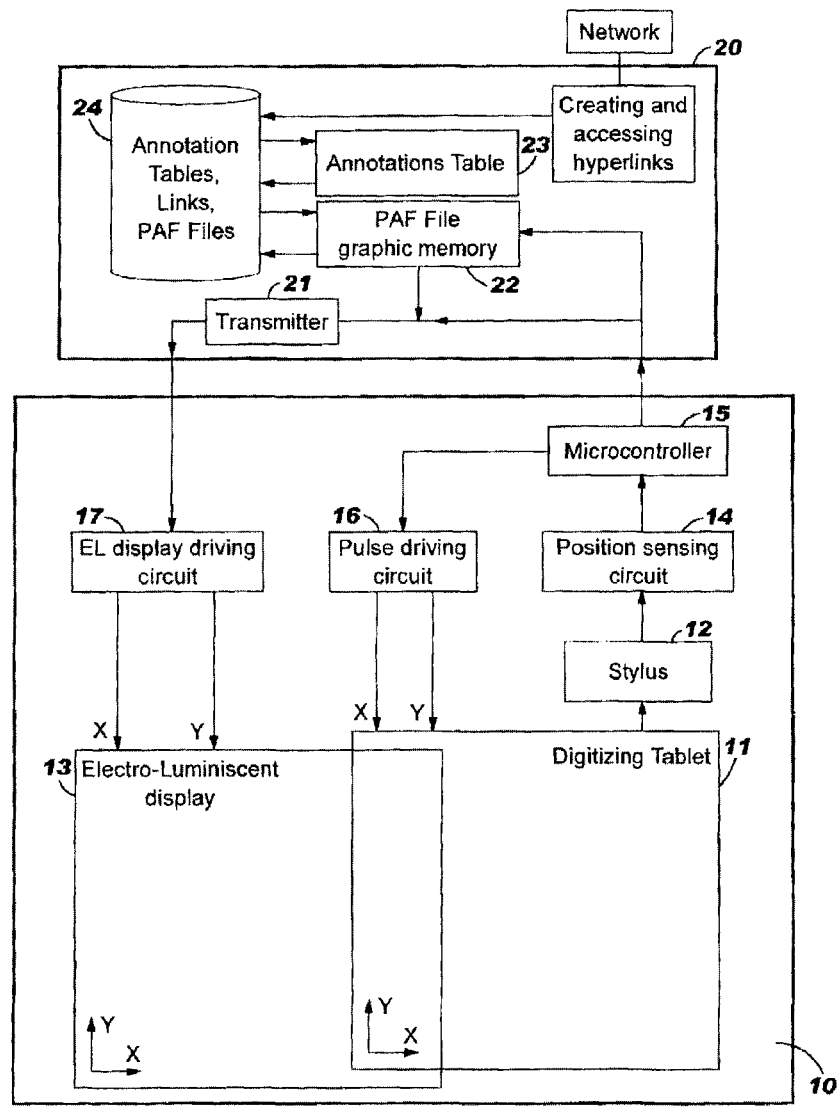
FIG. 2 is a block diagram illustrating a system for capturing and displaying handwritten information according to a second aspect of the invention.

As shown in FIG. 2, this apparatus 10 is used with a computer system 20. The computer system 20 can be a personal computer, an Internet enabled cell phone, a Personal Digital Assistant, an onboard computer, a network computer, an Internet appliance or a wireless IP enabled device. The apparatus 10 can communicate with the computer system 20 over an infrared link, a serial wired connection or any other communication means. The apparatus 10, the stylus 12 and the computer system 20 thus constitute a system for capturing and displaying electronic handwritten annotations.

The apparatus 10 comprises means 14 for digitizing annotations made by the stylus 12 and means 15 for sending digitized annotations to the computer system 20. In practice, a pulse driving circuit 16 alternately transmits driving pulses to the X- and Y-axis directions of the digitizing tablet 11 for sensing the current position of the stylus 12. The pulse driving circuit 16 is controlled by the microcontroller 15. The position of the stylus 12 is detected by capacitive coupling sensed in the digitizing tablet 11, that is the stylus 12 senses a position signal in a potential distribution on the digitizing tablet 11 using capacitive coupling, and provides the position to the digitizing means 14 which is referred to as a position sensing circuit 14.

The position sensing circuit 14 receives the current X- and Y-axis coordinate data of the stylus 12 and converts the coordinate data into digitized position data. The micro-controller 15 transfers data of the position detected from the position sensing circuit 14 to the computer system 20. Thus, the micro-controller 15 is used for sending digitized annotations to the computer system 20.

Upon reception of position data from the position sensing circuit 14, the micro-controller 15 analyses the position data to calculate the current position of the stylus and updates the computer system 20. This latter comprises means 21 for transmitting digitized annotations to the transparent electro-luminescent display 13 of the apparatus 10. Thus the data of the position of the stylus 12 is directly transmitted by the computer system 20 to an electro-luminescent display driving circuit 17 controlled by the computer system 20. The electro-luminescent display driving circuit provides X-, and Y-axis coordinate driving signals to the electro-luminescent display 13 so that this latter can display the pixel on which is positioned the stylus through the transparent tablet 11.

The computer system 20 also comprises means 22, 23, 24 for storing digitized annotations sent by the transparent digitizing tablet 11 and an arrangement for creating and accessing hyperlinks. As described in detail in the following description, in reference to the method performed by the system, the storing means 22, 23, 24 are adapted to store digitized annotations associated with a reference to a physical document which is used in relation with the apparatus 20.

Figure 4:
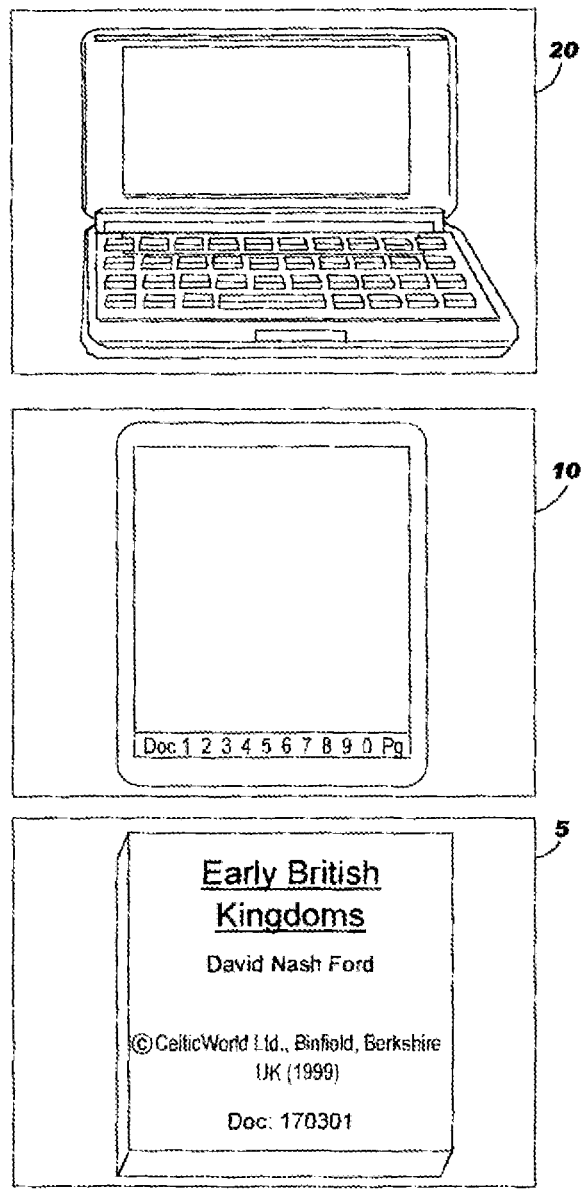
FIGS. 4 to 6 illustrate the method for capturing and displaying handwritten annotations on a physical document.

As illustrated on FIG. 4, the apparatus 10, connected to the computer system 20 is used to create annotations relating to a physical document 5. Here, this document to be annotated is a book of several pages, entitled "Early British Kingdoms". Any kind of document can be used, and for example, geographic maps, technical plans, commercial catalogs or even any other type of hard-copy, engraved, written or printed surfaces. The physical document 5 could also be a blank paper sheet or a printed form to be filled in. The material of the physical documents can be paper, plastic, wood or any other material.

Figure 3:
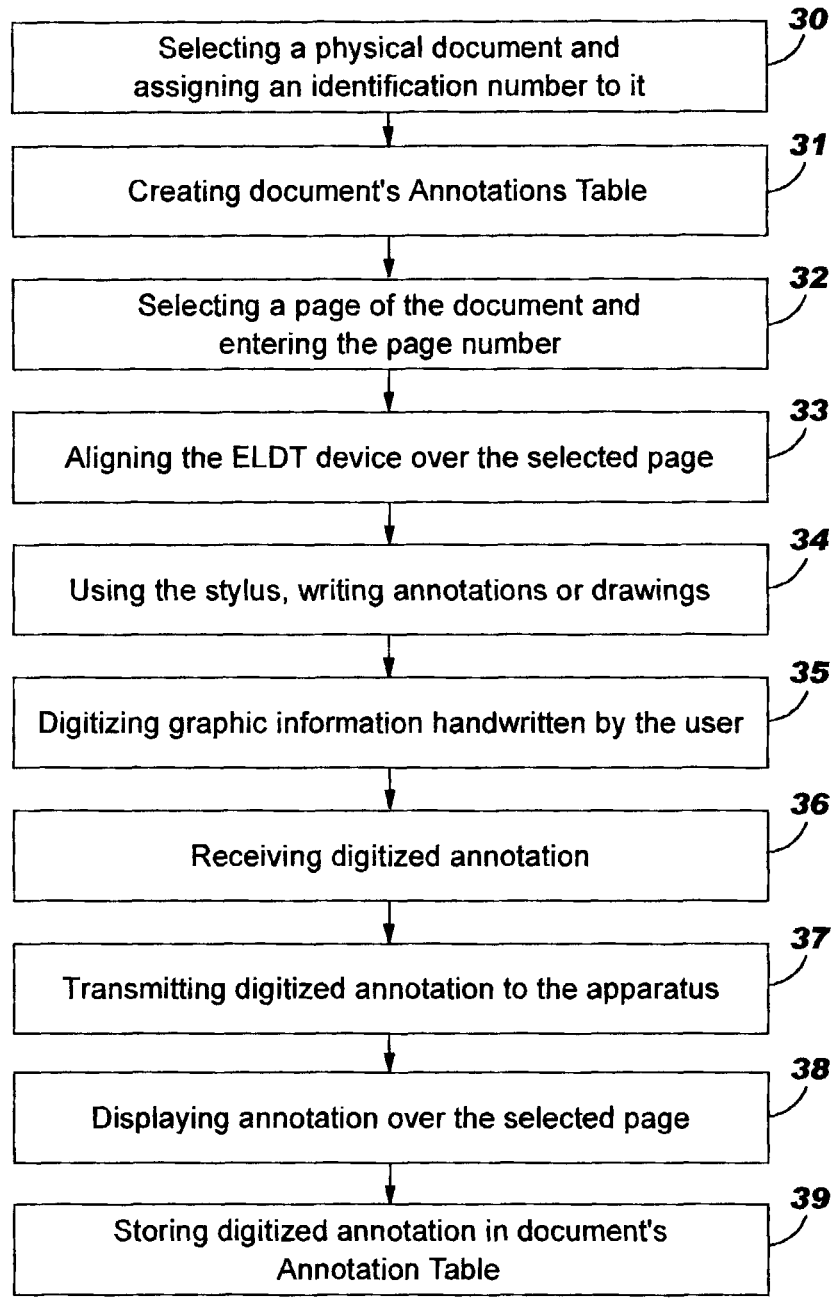
FIG. 3 illustrates an algorithm for a method of capturing and displaying handwritten information according to a third aspect of the invention.
Figure 5:
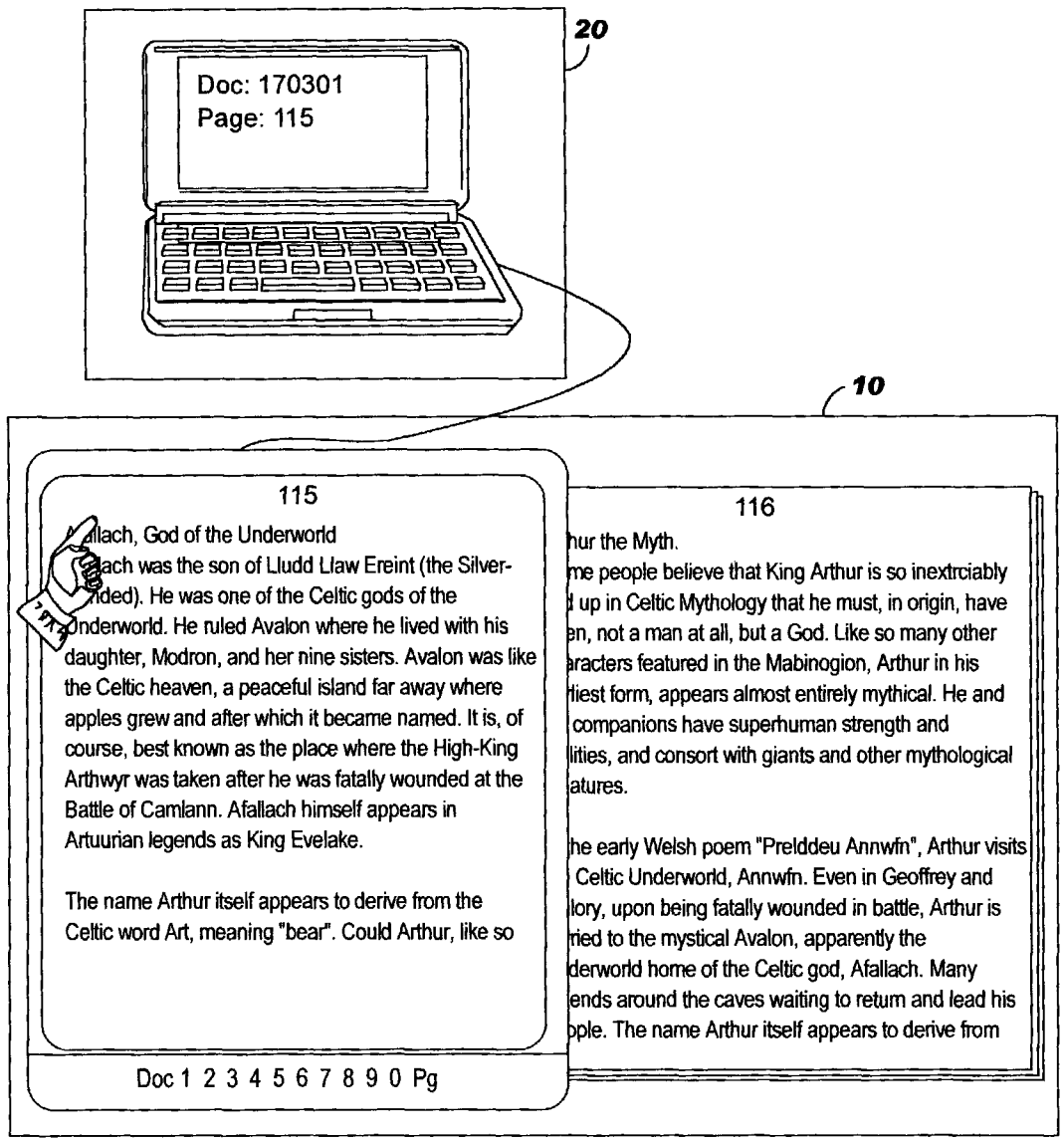

As shown on the embodiment of FIG. 3, the method comprises first a step 30 of selecting a physical document and assigning an identification number to it. Here, the identification number is a reference, such as Doc: 170301, which can be written on the document, for example on the first page of the book. A document's annotation table is then created in a creating step 31. As shown on FIG. 5, the annotation table is created on the computer system 20. It comprises the reference number of the document and possibly, other relevant information related to the document such as the title, author, ISBN (International Standard Book Number), date, and so forth.

In a selecting step 32, a page of the document, here the page 115, is selected and entered in the annotation table. This step corresponds to open a new page entry on the annotation table. An aligning step 33 is then performed wherein the apparatus 10 comprising digitizing tablet 11 and electro-luminescent display 13 in a stack superposed over the selected page of the document. This location of the apparatus is clearly shown in FIG. 5. Since the apparatus comprises superposed sheets that are both transparent, the page of the document underneath the apparatus can be read through the apparatus 10. Preferably, the apparatus 10 is aligned with the borders of the page by some conventional means, for example by adjusting the upper left corner of the page with the upper left corner of the apparatus 10.

Figure 6:
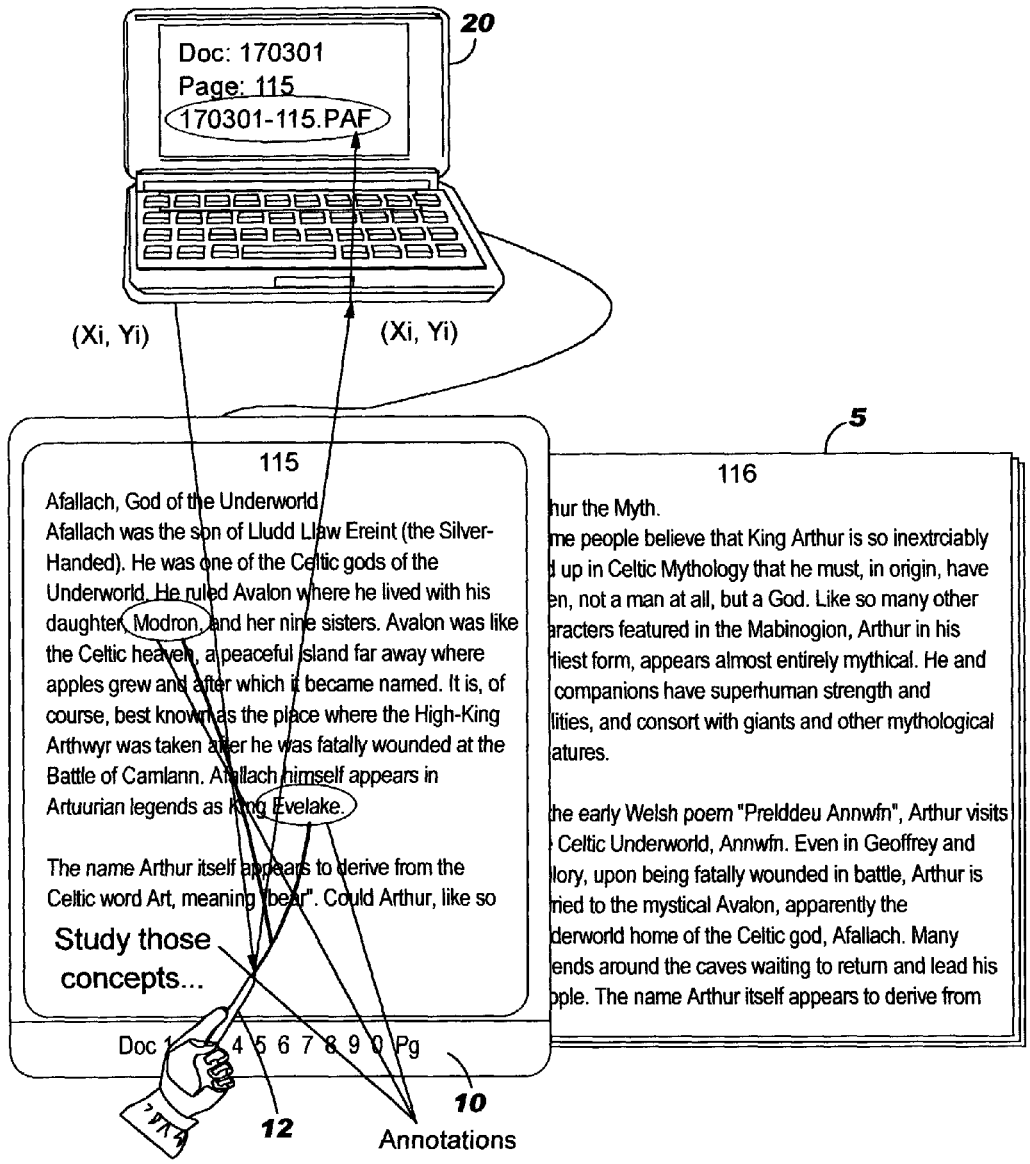

A writing step 34 is then performed by using the stylus 12 as shown in FIG. 6, in order to create annotations relating to the document. Any type of annotations (marks, texts, drawing, underlines, and so forth) can be handwritten by the stylus 12 on the digitizing tablet 11 of the apparatus 10. These annotations made by a user can be directly related to the content of the page seen through the apparatus 10 by virtue of its transparency.

A digitizing step 35 is adapted to digitize annotations made by the stylus 12 on the transparent digitizing tablet 11. In practice, as illustrated in FIG. 6, the digitizing tablet 11 takes samples, digitizes the sequence $X_i, Y_i$ of coordinates of each point pressed by the stylus 12 on the tablet 11 and sends this sequence to the computer system 20. The succession of sequences of coordinates thus constitute a digitizing annotation sent to the computer system 20 during a sending step 36. Under control of the same computer system 20, the sequence of coordinates $X_i, Y_i$ are transmitted, i.e. sent back, to the apparatus 10, and more precisely, to the transparent electro-luminescent display 10. This transmitting step 37 is adapted to transmit digitized annotations in order to further highlight the digitized annotations during a displaying step 38.

In practice, each of the point coordinates $X_i, Y_i$ received by the elctro-luminescent display is decoded and the corresponding row and column drivers of the matrix of passive electro-luminescent elements become active. When active, the element (or pixel) located at the intersection of the selected row and column emits light. Obviously, only the electro-luminescent elements corresponding to the stylus strokes sensed by the digitizing tablet 11 must be continuously scanned and refreshed by the computer system 20. Unmarked areas of the apparatus 10 remain transparent, while only the areas marked by the stylus 12 are highlighted in order to display annotations made by the user directly over the selected page of the document, without physically marking this page. Thus, the method described above permits the entering and displaying of annotations simultaneously.

According to the preferred embodiment described here, the method further comprises a step 39 of storing, in the annotation table stored in the computer system, digitized annotations sent by the apparatus 10.

FIG. 6 shows how the sequence $X_i, Y_i$ of point coordinates, corresponding to stylus strokes is stored on the computer system 20, as a "Page Annotation File" (.PAF). that encodes the graphic information of the annotations made by the user. Once created, this .PAF file is referenced in the document's annotation table, associated with the selected document's page.

In this embodiment, the name of the file to be referenced is composed of the document's reference (here 170301) followed by the page number (here 115).

As an example, the annotation table associated with a document after annotating different pages (for example pages 3, 12, 57, 115, . . . , 213) would be as follows:

| DOC: 170301 | Title: "Early British Kingdoms" | Author: David Gnash Ford of Infield, Berkshire, UK |
|---|---|---|
| | Date: Jan. 28, 2000 | ISBN: 84-344-0856-2 |
| Pg.: 3 | File: 170301-003.PAF | |
| Pg: 12 | File: 170301-012.PAF | |
| Pg: 57 | File: 170301-057.PAF | |
| Pg: 115 | File: 170301-115.PAF | |

| Pg: . . . | File: 170301- . . . |
| Pg: 213 | File: 170301 -213.PAF |

Figure 7:
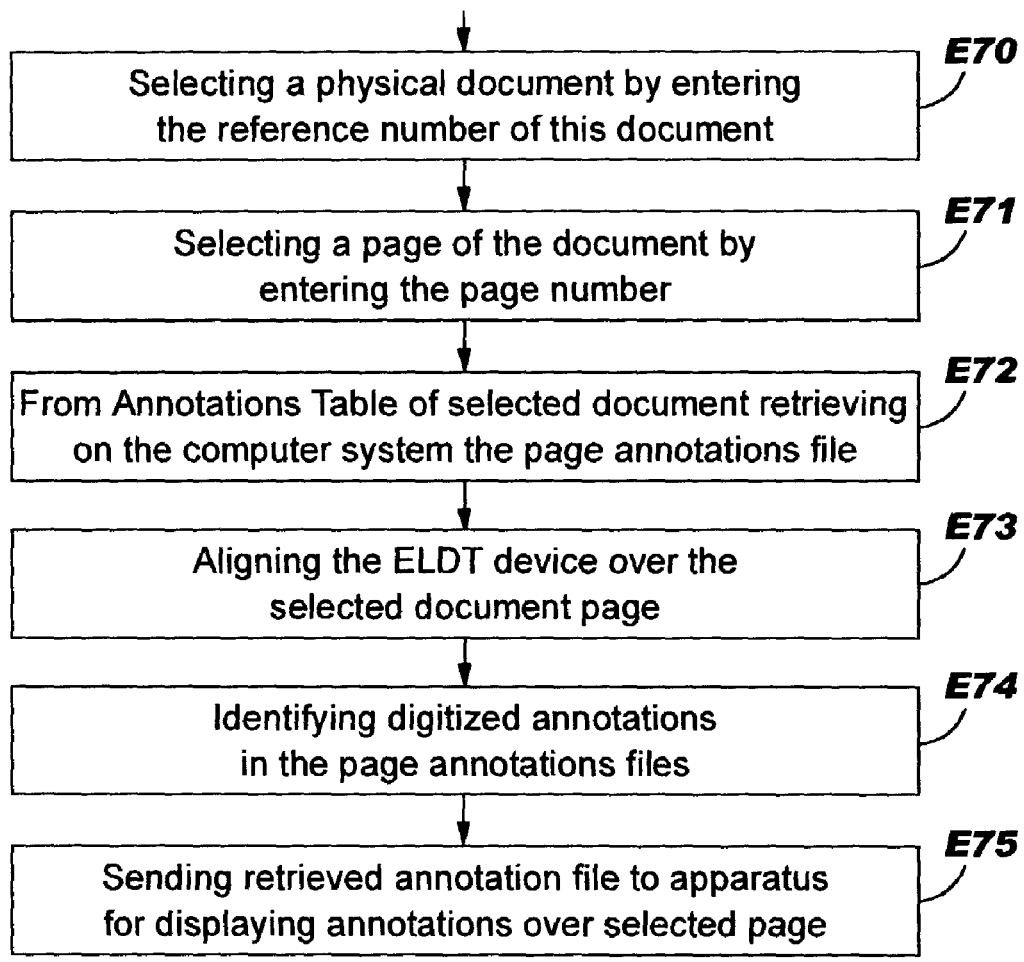
FIG. 7 illustrates an algorithm for a method of retrieving and displaying handwritten information according to a fourth aspect of the invention.
Figure 8:
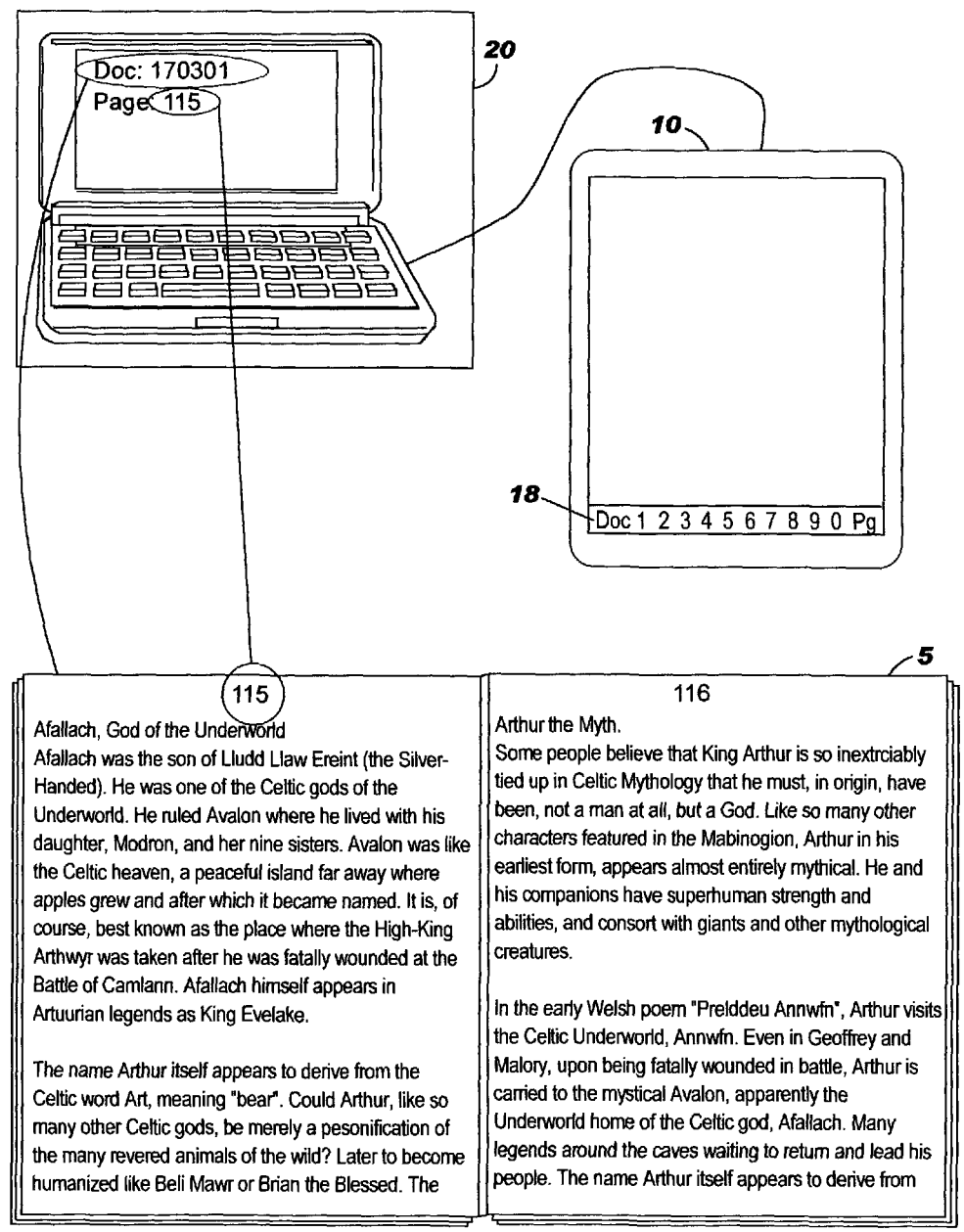
FIGS. 8 and 9 illustrate a method for retrieving and displaying handwritten information on a physical document.
Figure 9:
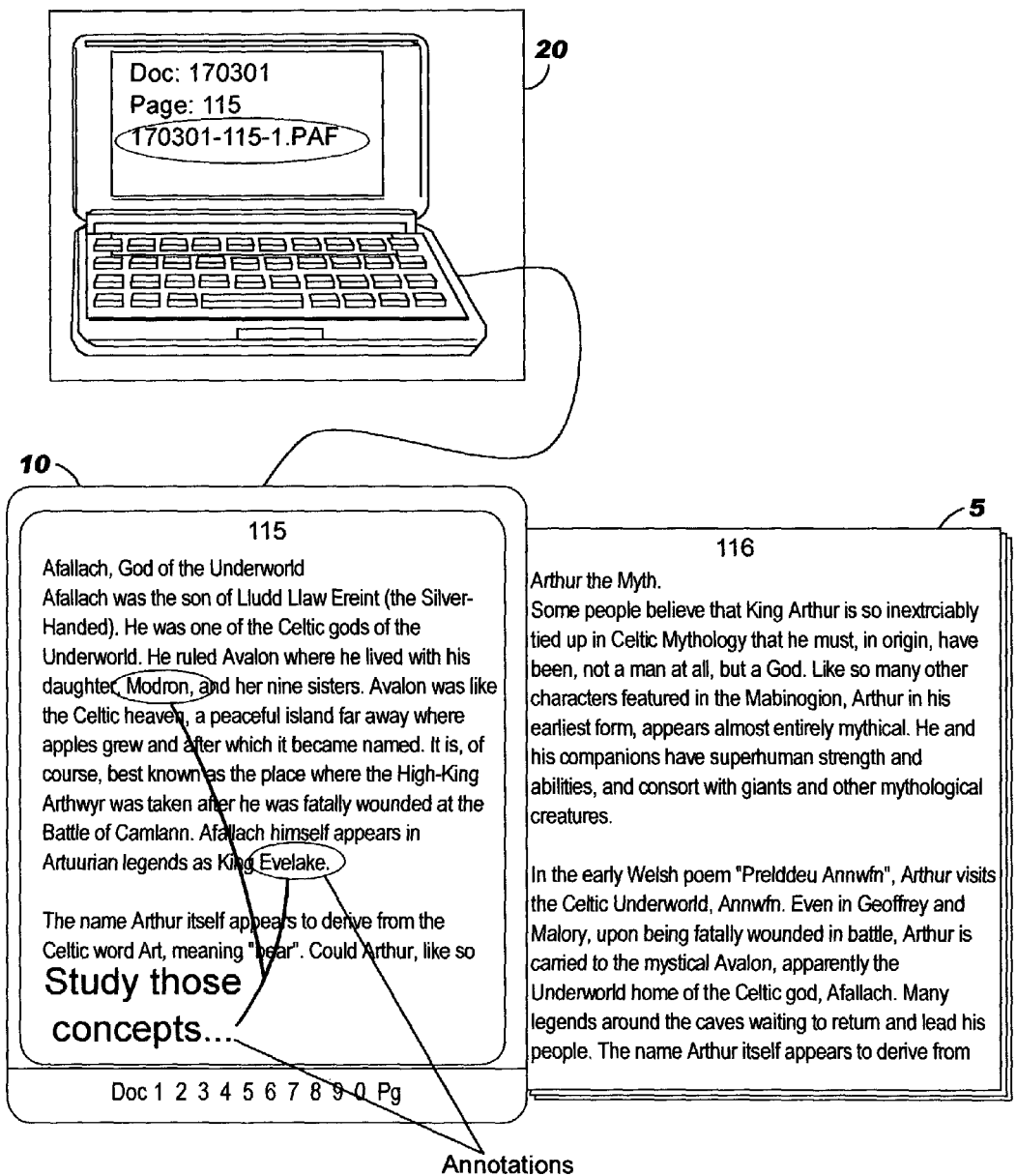

A method for retrieving and displaying electronic handwritten annotations on a physical document 5 is now described with reference to FIGS. 7 to 9. This retrieving method can be performed by the same user as the one who has made the annotations over the document or by another user from a computer system memorizing the annotation table associated with the document.

Firstly, the method of retrieving and displaying annotations comprises a step for identifying a physical document. In practice, a first selecting step 70 is adapted to select a physical document by entering a reference number of this document. The user can enter, by means of any interface (keyboard, mouse, etc.) the reference number, here Doc: 170301. As shown in FIG. 8, the apparatus 10 comprises here an array 18 of buttons, preferably touch sensitive, printed on a dedicated touch pad area of the apparatus, directly on the digitizing tablet 11. The user enters the reference of the physical document via a button marked "Doc" and number buttons. When this reference entered in the apparatus is transmitted via the microcontroller 15 to the computer system 20, this latter retrieves the annotation table associated with the selected document.

Next, a second selecting step 71 is performed to identify a page of the physical document 5, for example the page 115 of the book under consideration. The entering of the number of the page can be made as described above, via the button area 18. The number of the page is transferred from the apparatus 10 to the computer system 20 via the microcontroller 15 and in a retrieving step 72 the computer system identifies the page annotation file (e.g. 170301-115.PAF) of the selected page within the annotation table associated with the selected document. During the selecting step 70 and 71 and the retrieving step 72, the apparatus 10 can be disposed in any way vis—vis the physical document.

An aligning step 73 is then performed for aligning the apparatus 10 over the selected document page. This step is shown in FIG. 9. The upper left corner of the apparatus 10 can be adjusted in a conventional manner with the upper left corner of the page. Thanks to the transparency of the apparatus 10, the user can see the content of the selected document page through the apparatus 10.

Next, a step 74 of identifying digitized annotations stored in the page annotation file is performed. In fact, in the page annotation file, all the annotations made previously over the page of the document are encoded as graphic information. Next, during a sending step 75, the computer system 10 sends the retrieved annotations to the apparatus 10 for displaying the annotations via the transparent electro-luminescent display 13.

Consequently, the annotations that have been made by the user or by another user, are displayed by the apparatus 10 directly over the physical document, without marking it. Thus, if two remotely located users share copies of the same document, annotations made by any one user over his copy can be transmitted via a communication network, by sending the annotation table relating to the document, to the other user. This latter can then see the same annotations over his document, through an analogous system shown in FIG. 2. If the physical document is a form to be filled in, this form can be filled in for different persons without physically marking the form. Moreover, it may be noted that, when the physical document is simply a blank sheet of paper, the methods and the system according to the invention can be applied to create a handwritten document or drawing which is memorized in a page annotation file to be displayed again by the user or another user.

The above-described methods can be performed by microprocessors incorporated respectively in the apparatus 10 and the computer system 20.

The computer system 20 comprises also a Read Only Memory storing a computer program comprising computer readable instructions for carrying out the method for capturing and displaying handwritten annotations and for retrieving and displaying handwritten annotations.

The computer system 20 comprises a Random Access Memory adapted to store the modified parameters when the program is run, such as the Page Annotation Files associated with each selected physical document.

The computer program could also be stored on a hard disk of the computer system 20 or in a movable storage means such as a diskette or a CD-ROM which can be read by a reader incorporated in the computer system 20.

Persons skilled in the art will recognize that many variations of the teachings of this invention can be practiced that still fall within the claims of the invention which follow.

What is claimed is:

1. A system comprising:
a computer connected to a network; and
an apparatus connected to the computer, the apparatus comprising:
  a transparent digitizing tablet configured to receive input position data from a stylus, wherein the input position data comprises coordinate data that corresponds to annotations that a user of the apparatus is making to a document;
  a position sensing circuit configured to convert the input position data into position data corresponding to digitized handwritten annotations;
  a microcontroller configured to transmit the position data corresponding to the digitized handwritten annotations to the computer, wherein the computer is configured to save and transmit the position data corresponding to the digitized handwritten annotations;
  a display driving circuit configured to receive the position data corresponding to the digitized handwritten annotations from the computer, generate coordinate driving signals based on the position data corresponding to the digitized handwritten annotations, and transmit the coordinate driving signals;
  a transparent electro-luminescent display configured to receive the coordinate driving signals and display the digitized handwritten annotations, and
  a pulse driving circuit configured to alternately transmit driving pulses to the transparent digitizing tablet in a first direction of the transparent digitizing tablet and a second direction of the transparent digitizing tablet for sensing a current position of the stylus,
wherein the transparent digitizing tablet is superposed on the transparent electro-luminescent display and the transparent electro-luminescent display is superposed on the document, and
wherein the stylus is configured to sense a position signal in a potential distribution on the transparent digitizing tablet based on the driving pulses and provide, as the input position data, the current position of the stylus to the position sensing circuit which is configured to convert the input position data into the position data corresponding to the digitized handwritten annotations.

2. The system of claim 1, wherein the saving the position data corresponding to the digitized handwritten annotations comprise saving the position data corresponding to the digitized handwritten annotations as a file, and the computer is further configured to:
generate an annotation table for the document;
receive page number input from the user, which indicates a page in the document where the user is making the annotations to which the input position data corresponds;
reference the file in the annotation table; and
associate the received page number input with the reference of the file.

3. The system of claim 2, wherein the annotation table includes an identification number assigned to the document.

4. The system of claim 2, wherein the annotation table includes an identification number assigned to the document, and the computer is further configured to retrieve the file including the position data corresponding to the digitized handwritten annotations based on at least one of the identification number and the page number input.

5. The system of claim 1, wherein the computer is further configured to transmit the position data corresponding to the digitized handwritten annotations to a display external to the apparatus.

6. The system of claim 1, wherein the pulse driving circuit is controlled by the microcontroller.

7. An apparatus comprising:
a transparent digitizing tablet that is configured to receive input position data from a stylus, wherein the input position data comprises coordinate data that corresponds to annotations that a user of the apparatus is making to a document;
a position sensing circuit configured to convert the input position data into position data corresponding to digitized handwritten annotations;
a microcontroller configured to transmit the position data corresponding to the digitized handwritten annotations to a computer system;
a display driving circuit configured to receive the position data corresponding to the digitized handwritten annotations from the computer system, generate coordinate driving signals based on the position data corresponding to the digitized handwritten annotations, and transmit the coordinate driving signals;
a transparent electro-luminescent display configured to receive the coordinate driving signals and display the digitized handwritten annotations, and
a pulse driving circuit configured to alternately transmit driving pulses to the transparent digitizing tablet in a first direction of the transparent digitizing tablet and a second direction of the transparent digitizing tablet for sensing a current position of the stylus,
wherein the transparent digitizing tablet is superposed on the transparent electro-luminescent display and the transparent electro-luminescent display is superposed on the document, and
wherein the stylus is configured to sense a position signal in a potential distribution on the transparent digitizing tablet based on the driving pulses and provide, as the input position data, the current position of the stylus to the position sensing circuit which is configured to convert the input position data into the position data corresponding to the digitized handwritten annotations.

8. The apparatus of claim 7, wherein the pulse driving circuit is controlled by the microcontroller.

9. A method comprising:
receiving input position data from a stylus on a transparent digitizing tablet of an apparatus, wherein the input position data comprises coordinate data that corresponds to annotations that a user of the apparatus is making to a document;
converting the input position data into position data corresponding to digitized handwritten annotations by alternately transmitting driving pulses to the transparent digitizing tablet in a first direction of the transparent digitizing tablet and a second direction of the transparent digitizing tablet for sensing a current position of the stylus on the transparent digitizing tablet, wherein the stylus is configured to sense a position signal in a potential distribution on the transparent digitizing tablet based on the driving pulses and provide, as the input position data, the current position of the stylus to a position sensing circuit which is configured to convert the input position data into the position data corresponding to the digitized handwritten annotations;
transmitting the position data corresponding to the digitized handwritten annotations from the apparatus to a computer system;
receiving the position data corresponding to the digitized handwritten annotations at the apparatus from the computer system;
generating coordinate driving signals based on the position data corresponding to the digitized handwritten annotations;
transmitting the coordinate driving signals to a transparent electro-luminescent display of the apparatus; and
displaying the digitized handwritten annotations on the transparent electro-luminescent display.

10. The method of claim 9, wherein the transparent digitizing tablet is superposed on the transparent electro-luminescent display and the transparent electro-luminescent display is superposed on the document.

11. The method of claim 10, further comprising:
generating an annotation table for the document;
receiving page number input from the user, which indicates a page in the document where the user is making the annotations to which the input position data corresponds;
referencing a file in the annotation table; and
associating the received page number input with the reference of the file.

12. The method of claim 11, wherein the annotation table includes an identification number assigned to the document, and the method further comprises retrieving the file including the position data corresponding to the digitized handwritten annotations based on the identification number and the page number input.

13. The method of claim 9, further comprising saving the position data corresponding to the digitized handwritten annotations on the computer system, and transmitting the position data corresponding to the digitized handwritten annotations from the computer system to the apparatus after the saving.

14. The method of claim 11, further comprising transmitting the annotation table for the document to another apparatus.

15. The system of claim 1, wherein the coordinate data includes data corresponding to a first axis of the transparent digitizing tablet and data corresponding to a second axis of the transparent digitizing tablet.

16. The system of claim 15, wherein the position sensing circuit converts the coordinate data including the data corresponding to the first axis of the transparent digitizing table and the data corresponding to the second axis of the transparent digitizing tablet into the position data corresponding to the digitized handwritten annotations.

17. The system of claim 1, wherein the transparent electro-luminescent display is configured to display a pixel having a position corresponding to the current position of the stylus.

\* \* \* \* \*